United States Patent [19]

Spehrley, Jr. et al.

[11] E Patent Number: Re. 33,783

[45] Reissued Date of Patent: Dec. 31, 1991

[54] DOCUMENT SCANNING SYSTEM

[75] Inventors: Charles W. Spehrley, Jr., White River Junction, Vt.; Gary W. Schneider; Curtis A. Lipkie, both of Littleton, Colo.; Dean H. Cranston, Lebanon, N.H.

[73] Assignee: Intergraph Corporation, Huntsville, Ala.

[21] Appl. No.: 391,288

[22] Filed: Aug. 9, 1989

Related U.S. Patent Documents

Reissue of:

[64] Patent No.: 4,686,581
Issued: Aug. 11, 1987
Appl. No.: 764,295
Filed: Aug. 9, 1985

[51] Int. Cl.[5] ..... H04N 1/12

[52] U.S. Cl. ..... 358/494; 358/482

[58] Field of Search ..... 358/482, 494, 483, 481, 358/474, 456, 455

[56] References Cited

U.S. PATENT DOCUMENTS

| | | | |
|---|---|---|---|
| 3,461,229 | 8/1969 | Oppenheimer | 358/456 |
| 4,041,454 | 8/1977 | Shepard | 358/481 |
| 4,318,135 | 3/1982 | Allis | 358/474 |
| 4,433,346 | 2/1984 | Stoffel | 358/455 |
| 4,449,151 | 5/1984 | Yokota | 358/483 |
| 4,542,414 | 9/1985 | Nagane | 358/482 |

*Primary Examiner*—Howard W. Britton
*Attorney, Agent, or Firm*—Bromberg & Sunstein

[57] ABSTRACT

[The invention provides a] *A* scanner system [which] in one embodiment includes only a single moving part in the document path, namley a drive roll, which serves not only to move the document through the system, but also to provide a backing against which the document is pushed while a proximate region thereof is being scanned. [The invention in an] *An* embodiment also provides an opto-mechanical assembly that is shock-mounted to the frame of the system at only three-spaced apart locations, so that the assembly tends to be isolated from vibration and torsional forces.

8 Claims, 9 Drawing Sheets

DOCUMENT SCANNING SYSTEM

Matter enclosed in heavy brackets [ ] appears in the original patent but forms no part of this reissue specification; matter printed in italics indicates the additions made by reissue.

TECHNICAL FIELD

The present invention relates to facsimile devices, and more particularly to document scanners, that is, devices for scanning documents on which graphic information is present and for producing an electrical output related to the intensity of information at identifiable locations along each of a series of successive parallel scan lines.

BACKGROUND ART

Document scanners are well-known in the art. Prior art approaches, however, especially for large documents, tends to have complex designs to try to achieve document flatness along the scan line. Multiple camera systems are generally difficult to align and to keep in alignment; and systems tend to be sensitive to vibration and other external forces. Finally, systems tend to have a limited dynamic range, owing to the varying and limited physical characteristics of individual cells in charge-coupled devices (CCDs) commonly used as photo-electrical transducers in such systems, and to the difficulty in achieving uniform illumination along the scan line.

DISCLOSURE OF INVENTION

The invention provides a scanner system which in one embodiment includes only a single moving part in the document path, namely a drive roll, which serves not only to move the document through the system, but also to provide a backing against which the document is pushed while a proximate region thereof is being scanned. The invention in an embodiment also provides an opto-mechanical assembly that is shock-mounted to the frame of the system at only three-spaced apart locations, so that the assembly tends to be isolated from vibration and torsional forces.

BRIEF DESCRIPTION OF THE DRAWINGS

These and other features of the invention will be more readily understood by consideration of the following detailed description taken with the accompanying drawings, in which.

DETAILED DESCRIPTION

Figure 1:
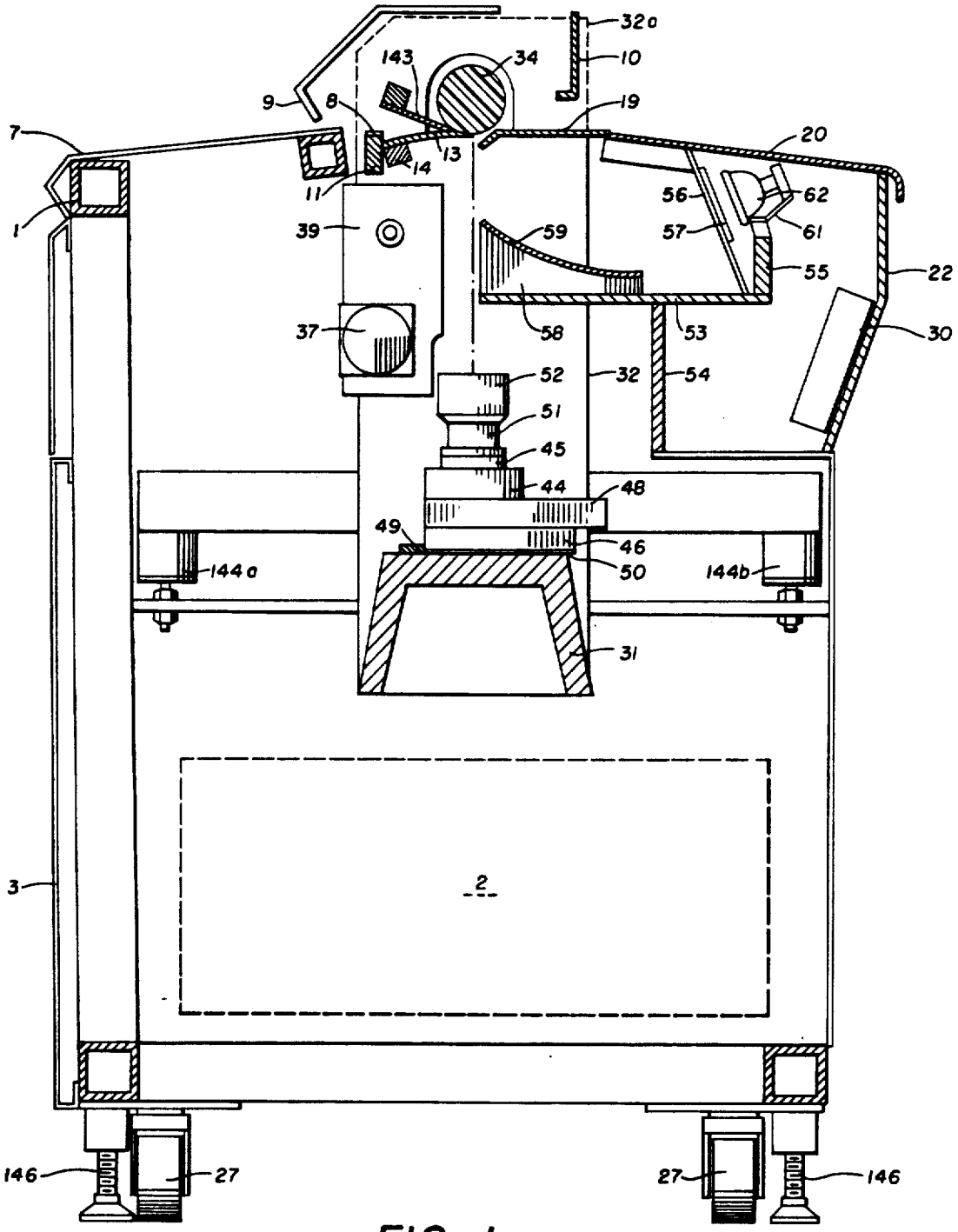
FIG. 1 is a vertical section of a preferred embodiment of a system in accordance with the present invention.
Figure 2:
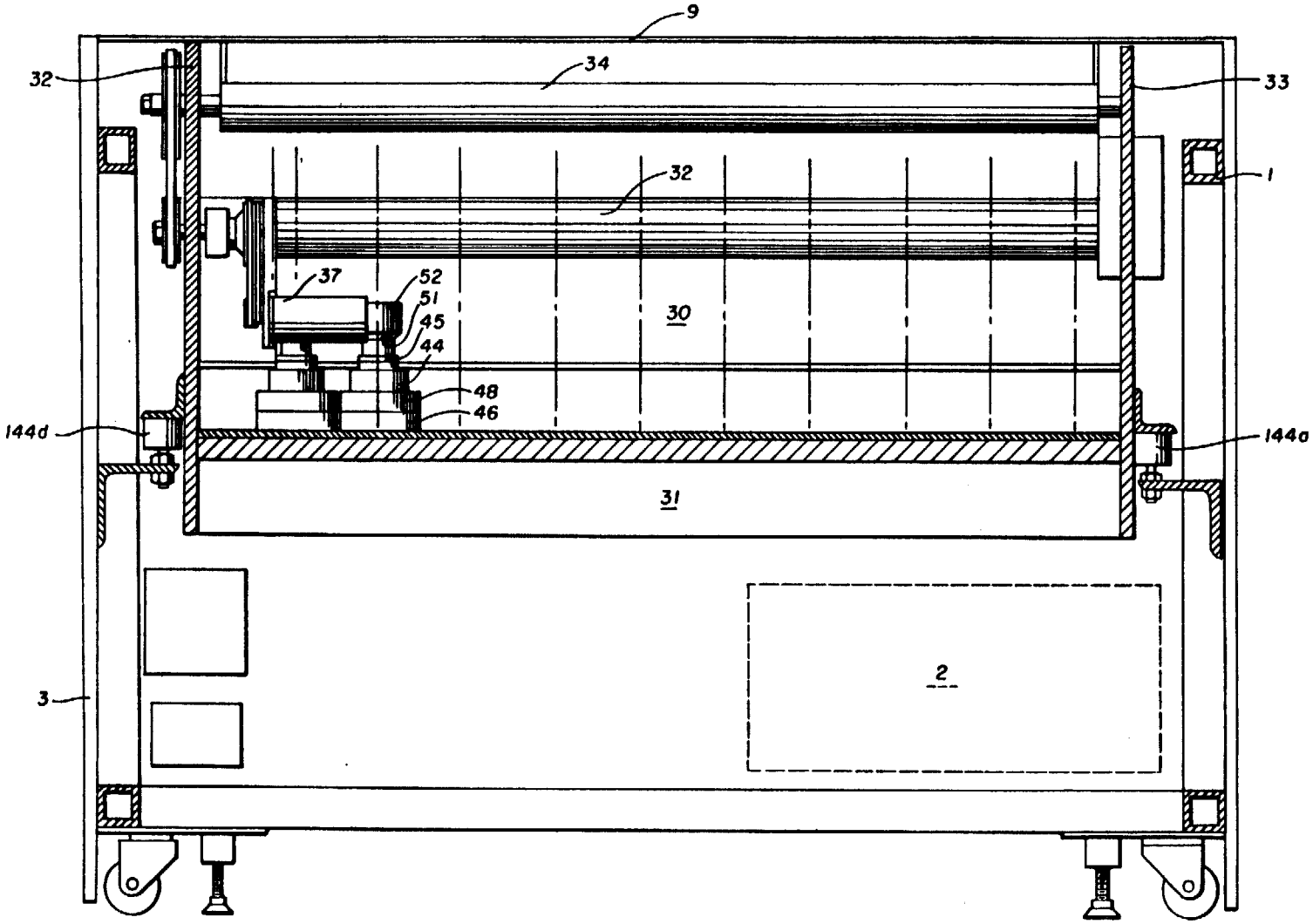
FIG. 2 is another vertical section of the embodiment of FIG. 1 taken through the plane B—B therein.

FIG. 1 presents a vertical section of a preferred embodiment of a system in accordance with the present invention. The section is taken through the plane C—C shown in FIG. 2, and so the system in FIG. 1 is viewed from the right side looking toward the left side. FIG. 2 is another vertical section of the embodiment of FIG. 1 taken through plane B—B therein, and is a view of from near the front looking toward the rear. This embodiment includes a precision drive roll 34 against which is engaged a long edge of flat metal bail spring 13. As described in more detail below, a document to be scanned is pressed by the bail spring 13 against the drive roll 34, so that the document is moved through the system as the drive roll is rotated about its axis. (Although the present description refers to a "document", the invention is applicable to text and drawings on paper, on transparencies, and generally on any substrate on or in which graphic information is recorded and viewable from a surface thereof; it is in this sense that the term "substrate" is used in the claims below.) The invention is believed novel in utilizing the drive roll 34 not only to move the document through the system, but also to serve as the backing against which the document is pushed while a proximate region thereof is being scanned. Optical design criteria therefore require that the drive roll be as uniform a cylindrical shape as possible, so as to keep the camera to document distance from varying unduly.

The bail spring 13 is mounted along the other edge of its length onto bar 14, which, in operating position, is orientated so that the bail spring 13 is deflected approximately one-half inch (1.3 cm) at the edge of its engagement with the drive roll, from its undeflected position. The bail spring is here stainless steel shim stock with a thickness of about 0.012 inches (0.3 mm) and has a stiffness of about one pound per inch of deflection per inch of length (70 g per cm of deflection per cm of length), so that in operation there is a normal force against the drive roll of about one-half lb. per inch of length (90 g per cm of length) The relative local resilience of the bail spring permits it to conform to local irregularities in the document or the drive roll surface and still apply the normal force along substantially the whole length of the drive roll. Because the drive roll is approximately 44 inches (112 cm) long, the total normal force on the drive roll is only about 22 lbs. (10 kg). The drive roll is of white polyurethane having a hardness in the vicinity of Shure A60 and has a friction coefficient in a range above approximately 0.7 or 0.8, whereas the upper surface of the bail spring is coated with a high molecular weight polyethylene film having a fraction coefficient of about 0.2 or lower. The difference between these friction coefficients of about 0.5 produces a positive drive force on the document of about one-quarter lb.

per inch of length (45 g per cm of length). The drive roll provides a white reflective background which therefore permits the scanning of transparencies as well as opaque documents.

Figure 4:
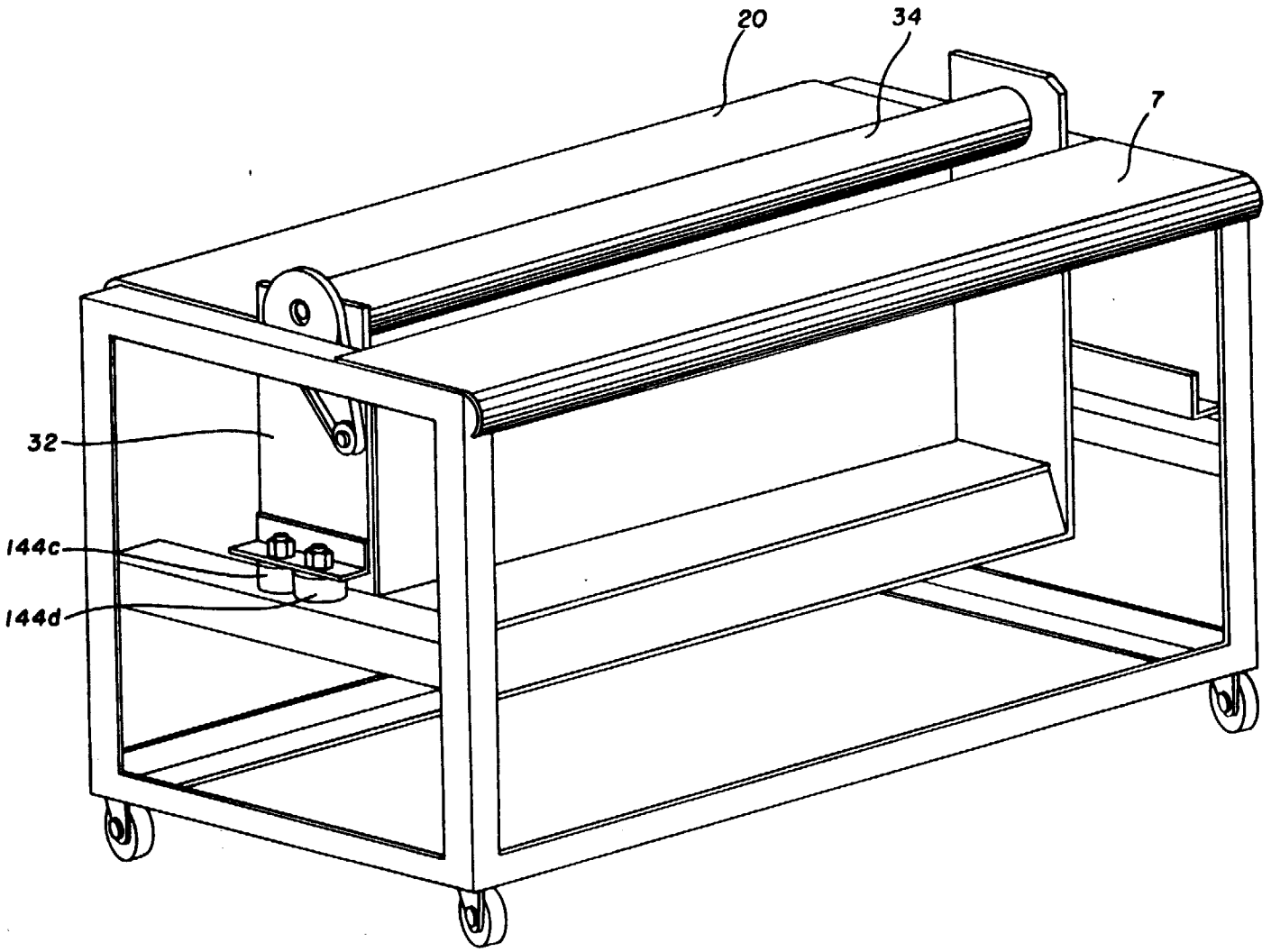
FIG. 4 is a perspective view of the embodiment of FIG. 1 as seen from the left.

The drive roll 34 is rotatably mounted between left side plate 32 (the top of which is shown in phantom as 32a) and right side plate 33 (shown in FIGS. 2 and 4). For strength and rigidity, the side plates 32 and 33 are made of steel. The camera bed 31 is made of meehanite cast iron and runs between the side plates 32 and 33, to which it is rigidly attached; collectively these three items, together with cross bracing between the side plates afforded by bracket 10, stringer 11, and incidentally by items such as illumination mounting plate 53, form a subframe for an opto-mechanical assembly that is shock-mounted to system frame 1. The system uses a plurality of cameras—ten were used in this embodiment—each camera including a base 46 (mounted on the bed 31), lower housing 48, upper housing 44, lens 52, lens adaptor 51, and lens ring lock 45. (The size of the camera assembly is somewhate exaggerated in FIG. 1.) Alignment of the cameras is critical. The alignment process is discussed in further detail below but utilizes, among other things, appropriate shims 50 placed between each camera base 46 and the camera bed 31, and the calibrated camera locating bar 49, which is marked in units of distance and secured to the camera bed.

Also mounted on the opto-mechanical subframe is an illumination assembly, including an array of incandescent lamps 62 (eighteen are used here) fitted with an infrared absorption lens 57, mounted on bracket 56. The array bracket 55 holding the array is mounted on illumination mounting plate 53, which also mounts reflector bracket 58, which defines the contour of reflector 59.

The reflector is generally a section of an ellipse in profile and is uniform in profile along its length, i.e. a longitudinal section of an elliptical cylindroid. The reflector is configured so that the lamps are placed along one of the two focus lines of the elliptical cylindroid and the second of the two focus lines is coincident with the region of the opto-mechanical assembly where the document is being scanned, so that light from the bulb array is focussed in this manner along the scan line. The elliptical cylindroid design has been found to be sufficiently efficient in concentrating light from the array that the design was found to be benefited by the introduction of diffusion to spread the illumination somewhat; satisfactory diffusion has been introduced by forming the reflector from a series of about ten flat reflective strips running the length of the reflector, so that the reflector's elliptical profile is approximated by linear segments, the orientation of each segment being determined by the bracket 58. The drive roll 34 is belt-driven by a conventional motor 37 and drive train assembly 39, which are also affixed to side plate 33 of the opto-mechanical subframe. The drive train permits the drive roll to rotate at either of two speeds, depending on whether the document is to be scanned at 500 or 1000 lines per inch (197 or 394 lines per cm).

Figure 3:
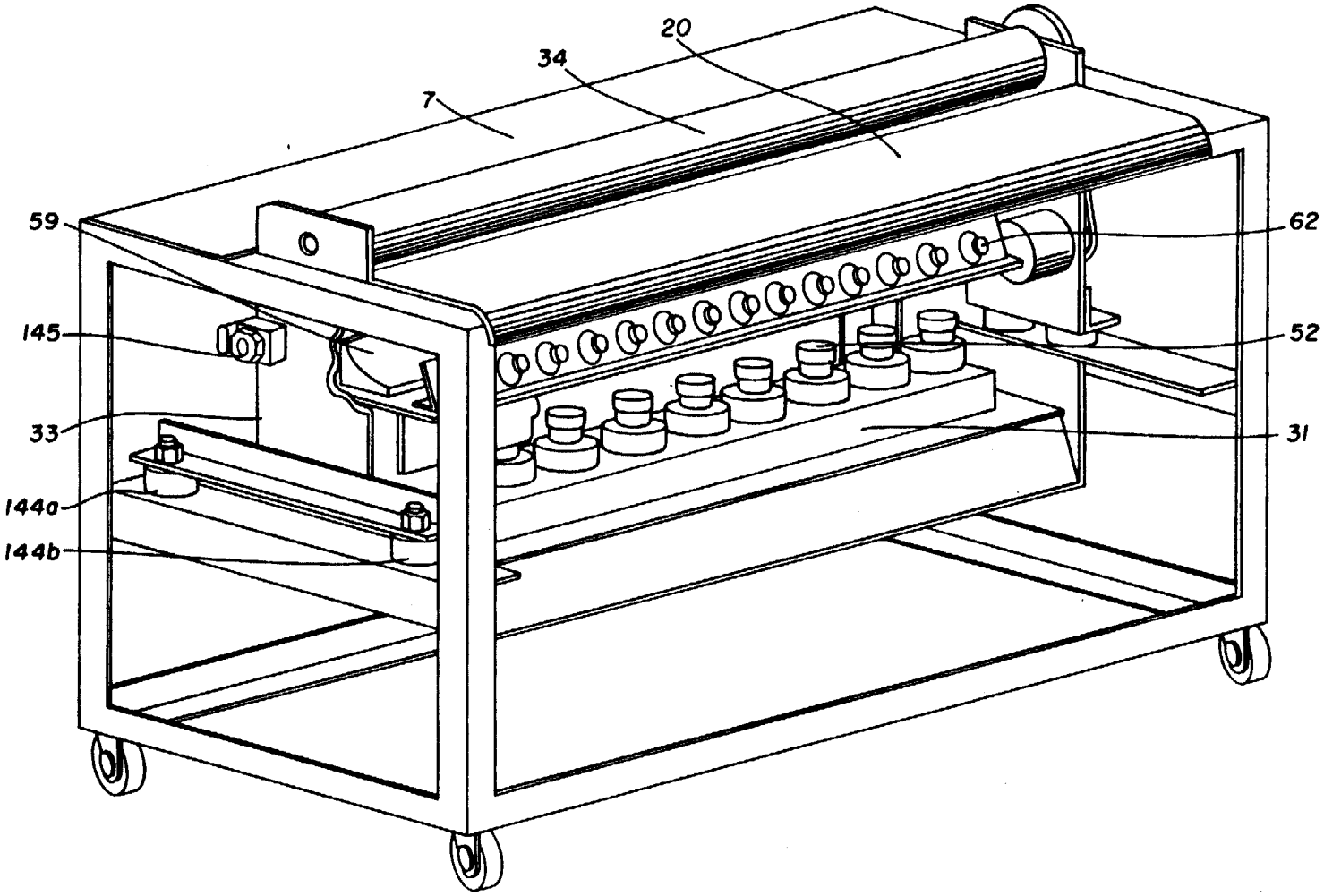
FIG. 3 is a perspective view of the embodiment of FIG. 1 as seen from the right.

The frame 1 of the system embodiment herein described, in being exposed to a normal office environment, is subject to vibration and to physical distortion. The effects of these phenomena on the opto-mechanical assembly (and therefore on the camera alignment and other critical dimensions) are minimized by shock-mounting it in only three locations to the frame. The mounts are designed so that the opto-mechanical assembly as a whole has a natural frequency of about 15 to 20 Hz on the mounts; the assembly has considerable mass, owing particularly to the mass of camera bed 31, and is itself rigid enough to have a much higher natural frequency. The shock mounts 144a and 144b on the right side plate 33 are shown in FIG. 1 and 3 to be spaced apart a substantial distance, approximately 30 inches (76 cm), so that each such shock mount defines a separate location. The shock mounts 144c and 144b on the left side plate 32 are shown in FIG. 4 to be adjacent to one another, defining a single location. These three locations collectively define a generally horizontal mounting plane. It can be seen that the pairs of shock mounts 144a and 144b on the one hand and 144c and 144d on the other hand are each symmetrically disposed with respect to the projection of the drive roll's axis of rotation onto this mounting plane. This symmetric design permits the use of effective shock mounting while still providing a three-location mounting design. In the event of distortion of the frame, the orientation of the mounting plane may be slightly altered, but the three-point mounting system is ineffective in transmitting torsional forces to the opto-mechanical system, which is thus insulated not only from vibration but also from physical distortion.

The frame 1 may be provided with suitable cover 3, cooling fan 30, and house associated electronic circuitry 2. The entire system rests on four legs 146 of adjustable height and may be moved via four casters 27.

In operation of the system, a document may be placed on the work table 7, which is affixed to the frame 1. With the information side facing down, the document is manually urged forward, beneath the cover 9 of the opto-mechanical assembly, jumps a small gap between the table 7 and the paper inlet guide 8, which is mounted on stringer 11 and forms part of the opto-mechanical assembly. As the document continues to be urged forward, it falls beneath upper guide 143, which prevents up-curling documents from avoiding the proper path through the system. The upper guide may be rigidly mounted or omitted, but here is hinge-mounted and utilizes only gravitational forces to restrain the document. On reaching the bail spring 13, the document is urged against the drive roll 34, which, on activation, rotates counterclockwise as viewed from the end showing in FIG. 1, and thereafter moves the document to the exit guide 19, which is also part of the opto-mechanical assembly. Finally, the document reaches the exit tray 20, which is mounted to the frame.

The present invention thus permits the document to encounter only a single moving part, the drive roll 34, In the present embodiment, the region along which the document is scanned is a line, approximately parallel to the axis of rotation of the drive roll 34 and to the edge of bail spring 13 that contacts the document, located approximately 0.040 inches (1 mm) beyond this edge in the paper path. In the development of this invention, it has been found that acceptable flatness of the document is generally maintained at this distance away from the bail spring, even in cases where the document may be creased or crinkled. This distance is more than sufficient to accommodate a typical pixel height of 0.002 inches (0.05 mm). There is a sacrifice in this design of the ability to scan the last approximately 0.040 inches (1 mm) of the trailing edge of the document, but no sacrifice with respect to the leading edge of the document; moreover, even tighter tolerances may be imposed here if desired.

In the event of a paper jam, or to insert the leading edge of a badly damaged document, or to pull a document through the system, bail spring 13 can be released from its operating position by rotation of bar 14. Bar 14 may be rotated between operating and open positions utilizing means well-known in the art, such as a linear actuator, solenoid, direct coupled stepping motor, or, in the present case, a motor-driven cam actuator; the motor for this arrangement is shown as item 145 in FIG. 3.

Figure 5:
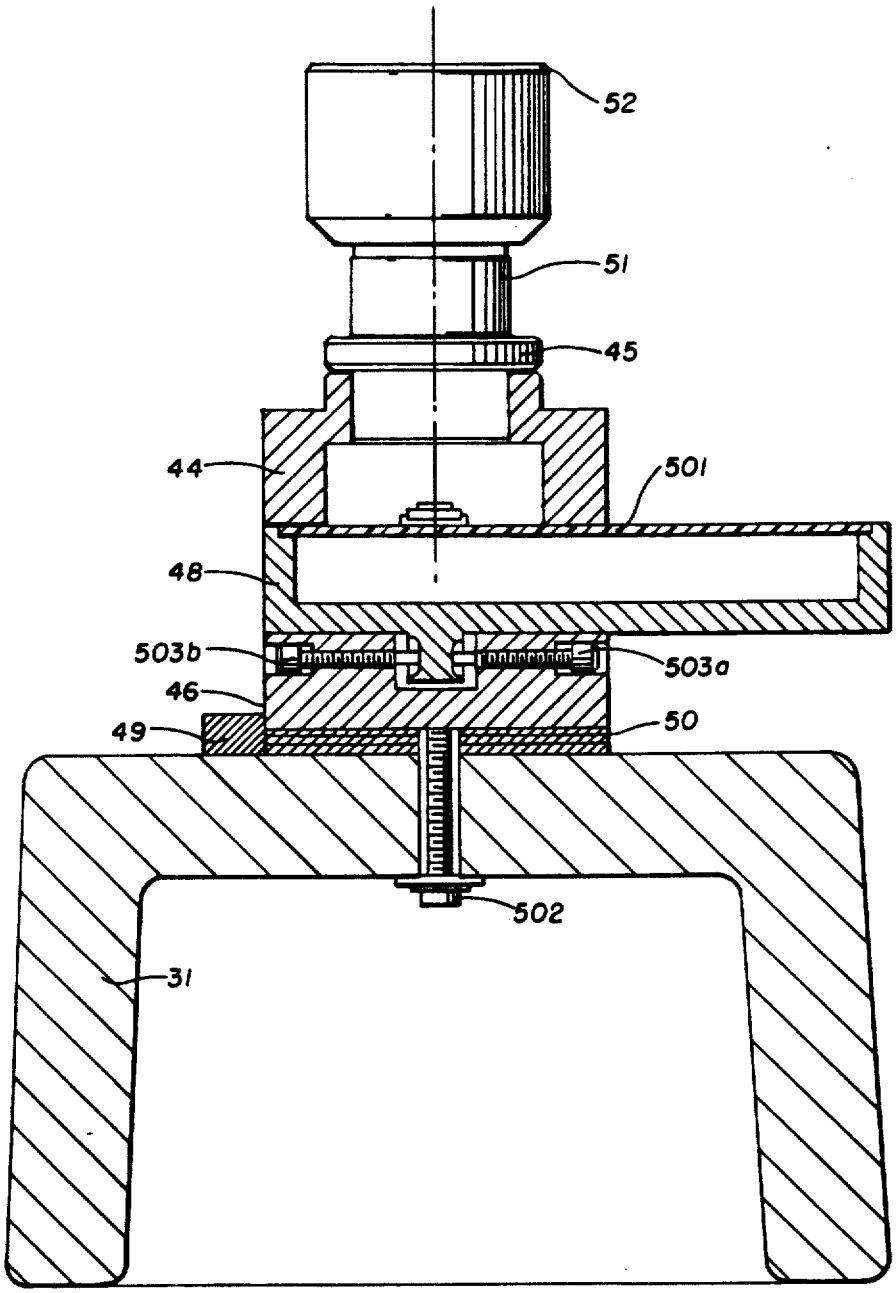
FIG. 5 is a more detailed view, from the same section as FIG. 1, of the camera assembly used in the embodiments shown therein.

FIG. 5 presents a more detailed view from the same section as FIG. 1 of the camera assembly used in the embodiment shown therein. Thus there are shown base 46, lower housing 48, upper housing 44, lens 52, lens adapter 51, and lens ring lock 45. The base 46 is mounted on bed 31 by a series of bolts 502. Camera circuit board 501, containing CCD array 505, is mounted on lower housing 48. The CCD array here contains 2048 cells, each along an axis generally parallel to the length of the camera bed, i.e., from left to right; each cell permits the determination of a pixel. With a horizontal resolution of 0.002 inches (0.0508 mm) per pixel, each camera may be responsible for 4.096 inches (10.40 cm) of scan width. Since this embodiment is designed to scan 40 inches (101.6 cm) with 10 cameras, each camera is responsible for 4 inches (10.16 cm) of scan width, giving a potential scan overlap of adjacent cameras of about 0.1 inch (2.5 mm).

The height of the camera assembly above the bed 31 is adjusted by means of shims 50. The adjustment of each camera assembly along the length of the bed 31 (along the axis perpendicular to the page) is relatively uncritical and is fixed permanently by bolts 502, after aligning an approximate optical center line (that has been previously determined for the individual camera assembly and inscribed on base 46) with the appropriate distance marking on locating bar 49. The reason that this particular adjustment is uncritical is that the scan lines of the cameras are designed to overlap, and the overlap is eliminated electronically in a manner described below. The base 46 is mounted so that one side thereof tightly abuts the locating bar. Alignment of the axis of the CCD array to coincide with the axes of the CCD arrays in the other cameras is accomplished mechanically by right pair 503a and 503b and left pair (not shown in FIG. 5) 503c and 503d of adjustment screws in base 46. Each pair contacts a corresponding nib 504 protruding downward from lower housing 48, permitting the nib (and therefore the corresponding side of the lower housing and an end of the CCD array thereon) to be moved toward the front or back and fixed in a desired location. Because each nib 504 is beveled, tightening each pair of adjustment screws causes the lower housing to be pulled snugly down against the base 46.

Figure 6:
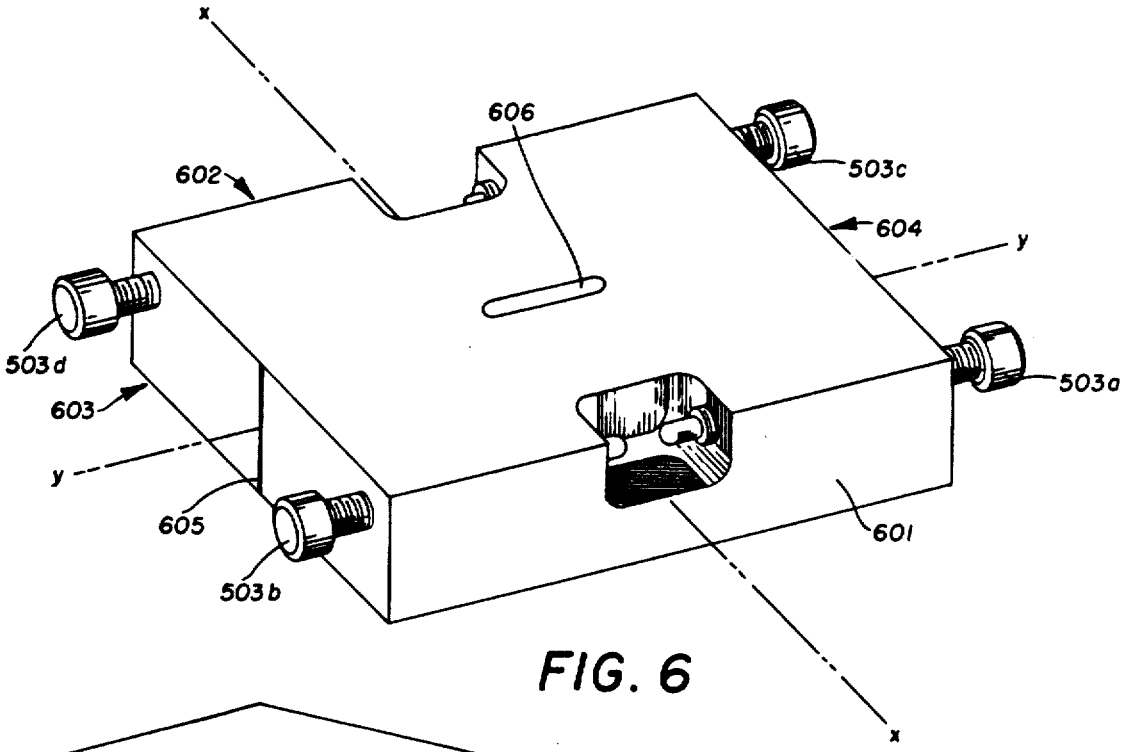
FIG. 6 is a perspective view of base 46 of FIG. 5 as seen from the right side and slightly toward its front.

FIG. 6 is a perspective view of base 46 of FIG. 5 as seen from the right side and slightly toward its front; this figure further illustrates the mechanical means for alignment. The right side 601 of the base 46 is that shown in FIG. 5, and the front of the base 46 is item 603; the left and back sides are 602 and 604 respectively. The CCD array runs along axis X—X. Adjustment of left pair 503c and 503d of adjustment screws (shown protruding here for clarity of illustration) is made by watching the output of the pixel of the leftmost cell in the CCD array after a thin dark thread has been placed in the system running between side plates 32 and 33 of FIGS. 1 through 3 along the optical center of the scan line (near the interface of bail spring 13 and drive roll 34). The output of the leftmost CCD in the array is watched until it is at a minimum (when it is viewing the thread). Similarly right pair 503a and 503b are adjusted while the output of the rightmost CCD is examined. The plastic deformation of each nib 504 permits the adjustment to be made with much more precision than would be anticipated merely by the ordinary matching screw pitches used for these adjustment screws. Satisfactory results have been achieved when the camera housing (and therefore the nibs) are aluminum, although other materials be chosen. In order to preserve the generally left-to-right alignment of the CCD array that was fixed by bolts 502, the base 46 contains an orientation slot 606 along front-to-back axis Y—Y into which fits an orientation pin protruding downward from lower housing 48 approximately under the center of CCD array so that the approximate optical center may not be subject to substantial translation along axis X—X, but permitting translation along axis Y—Y. Final left-to-right alignment is fixed when the pairs of alignment screws 503a through 503d are tightened. This alignment procedure can thus be accomplished with great speed in comparison to systems which merely adjust the translation along axis Y—Y and rotate the CCD axis about an optical center, because the adjustments of present invention have very little, if any, interaction and permit rapid readings of degree of proximity to exact alignment.

Figure 7:
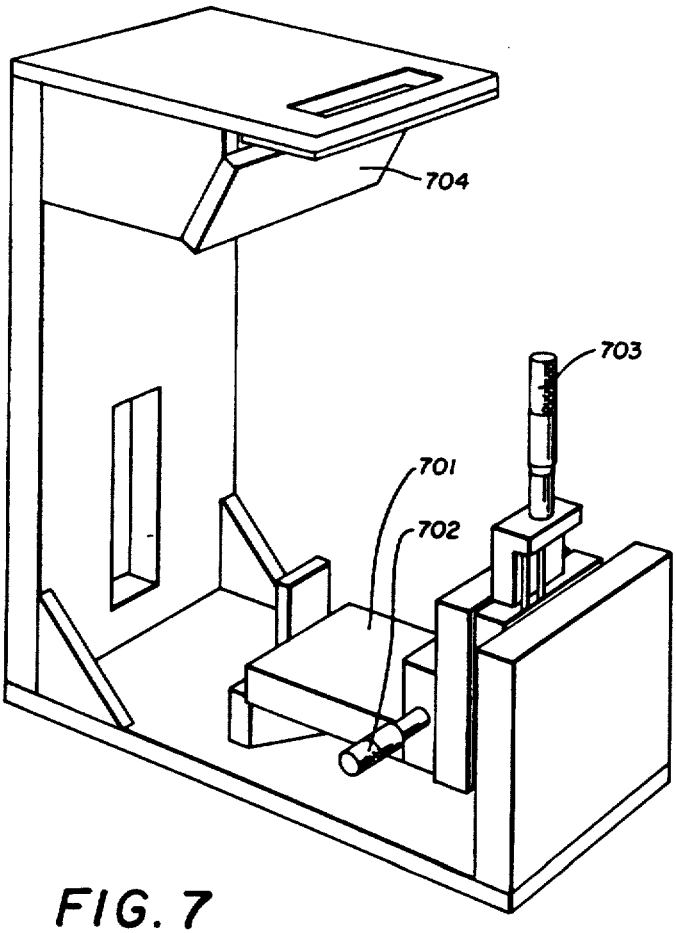
FIG. 7 is a perspective view of a preferred embodiment of a calibration fixture used for calibrating a camera in accordance with the present invention.

The magnification and focus of each camera are calibrated in novel fashion using a calibration fixture shown in perspective in FIG. 7. The base of the camera is mounted on platform 701, which may be moved laterally by calibrated vernier 702 and vertically by calibrated vernier 703. The camera views a suitable target mounted on target mount 704. The output of the camera's CCD array is measured when the camera views an illuminated grid of known frequency in lines per unit distance. The right magnification is achieved when, at a given distance of the camera from the target, the proper number of bars from the grid are detected over a given number of cells in the CCD array. Focus is adjusted by monitoring the amplitude of the light-to-dark ratio of the CCD output as the camera views the grid while the lens-to-CCD distance is adjusted. Focus and magnification are adjusted iteratively until the proper magnification has been achieved, and the focus adjustment is fixed by lens ring lock 45. Then a quantity related to the actual distance from the bed of the camera to the image plane is read from the vernier 703, and recorded. This same distance is maintained when the camera is mounted on bed 31 by use of suitably selected shims 50 in FIGS. 1 and 5. (In fact, the required shim thickness can be recorded directly on the base 46.) As a result, the alignment procedure for focus and magnification can be performed rapidly on manufacture of the system and is permanent. Furthermore the procedure is optically exact, and corrects for manufacturing tolerances in mounting the CCD array 505 on circuit board 501, in mounting the circuit board 501 on lower housing 48, in manufacture of the lens, and so forth.

The optical center point of the camera may be found by another simple procedure using the calibration fixture. A new target is used having a white side and a black side, each occupying one-half of the field as viewed left-to-right Vernier 702 is adjusted until the cell number 1024 in the CCD array is at the transition from white to black, and the optical center line may then be scribed onto the camera base. Such a center line is shown as item 605 in FIG. 6. However, as discussed above, this calibration is not critical.

Numerous items described above are matters of choice not essential to the invention. For example, the illumination system need not necessarily use eighteen bulbs, nor even be incandescent, nor use the geometric arrangement described above. The bail arrangement may also use, for example, a relatively flat bail member that is loaded against the drive roll by means of conventional coil springs, pressurized piston-cylinders, or electro-mechanical arrangement. The number of cameras is a matter of choice dictated by consideration among, other things, of the optical system, number of pixels capable of detection by each camera, geometry of the system, and maximum document width to be scanned. Similar considerations affect determination of scanning resolution and the like.

Figure 8:
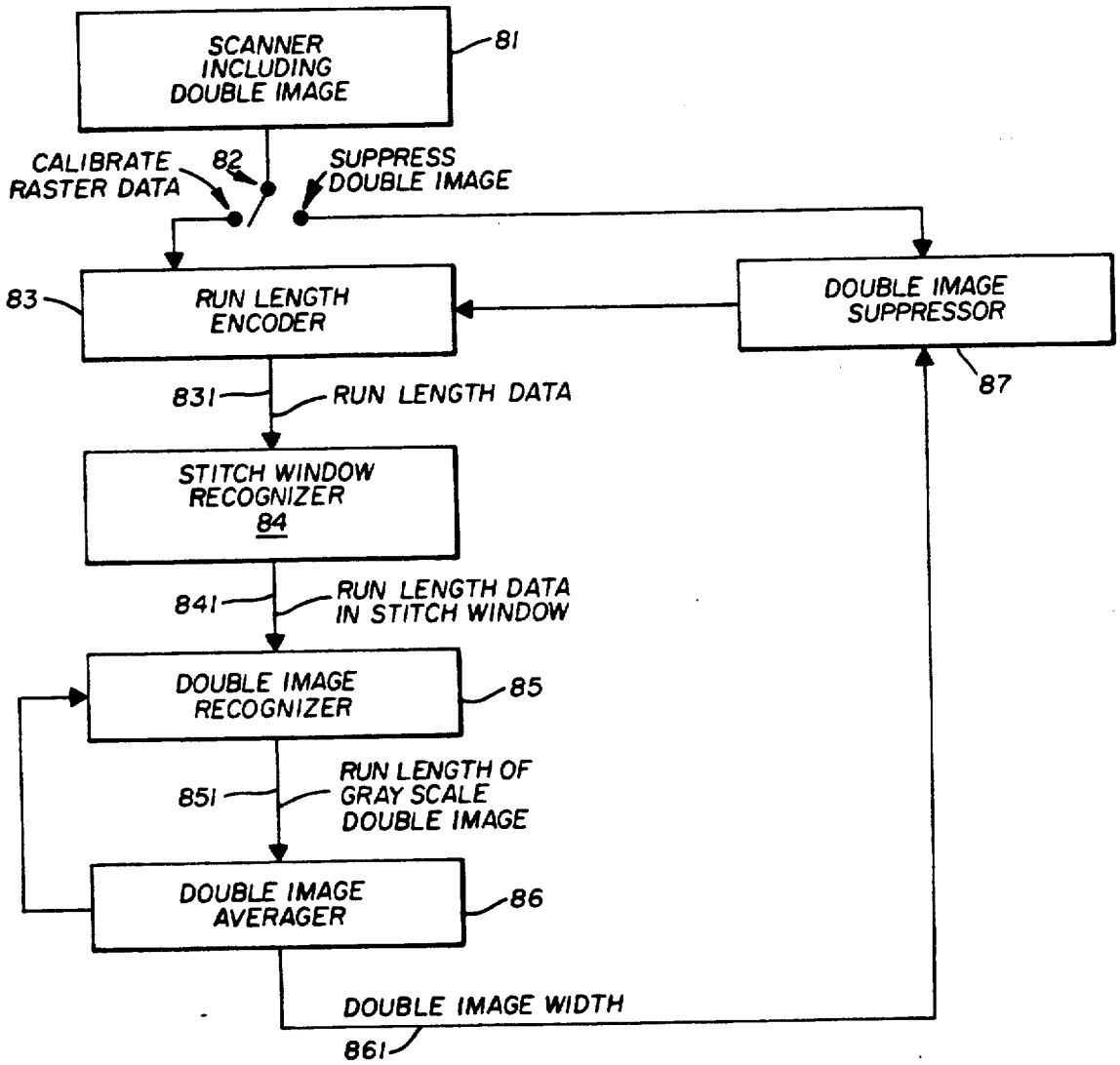
FIG. 8 is a block diagram of a preferred embodiment of the invention in dealing with overlap of the scan widths of adjacent cameras.
Figure 9:
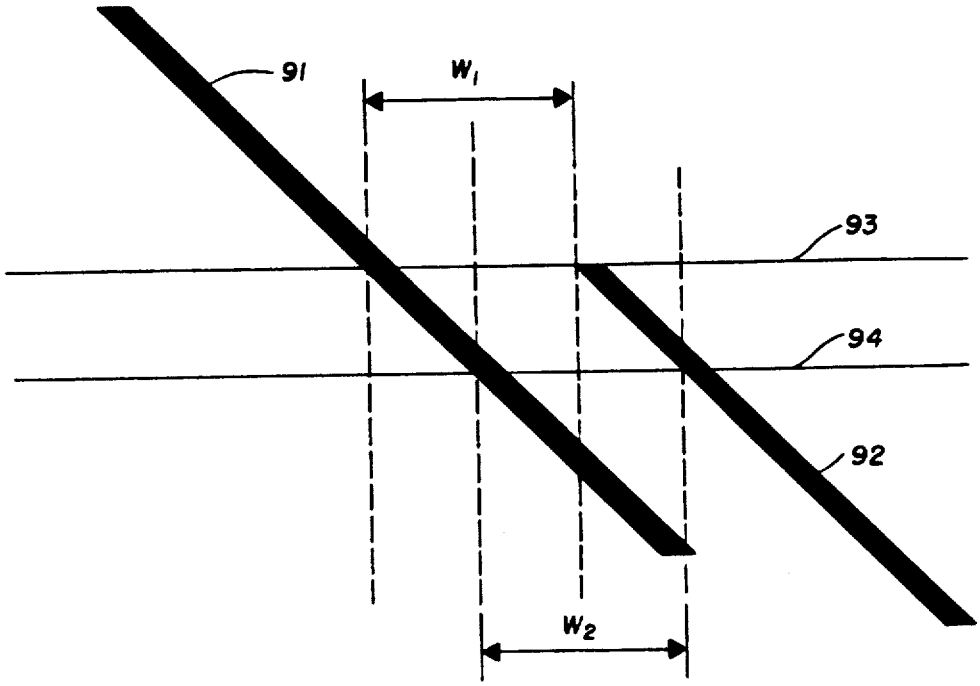
FIG. 9 illustrates operation of the arrangement of the arrangement of FIG. 8.

FIG. 8 is block diagram of a preferred embodiment of the invention in dealing with overlap of the scan width of adjacent cameras. As discussed above, the overlap of the scan width is dealt with electronically. The output of the scanner 81 is switched by switch 82 between a calibrate mode, in which the overlap is measured and dealt with, and the ordinary operation mode in which the overlap is suppressed. Consideration of the operation of this embodiment is further illustrated in FIG. 9. For the calibration mode, a document is scanned which has a straight line that runs at an angle down the document, so that eventually all the CCDs in all of the cameras view a portion of the line. Owing to the overlap of the scan width of adjacent cameras, the scanner output of such a document will indicate a series of lines, a portion of which series is shown in FIG. 9. That is, the output of one camera will give a scanner output such as indicated by line 91, while the output of the next successive camera will give an output indicated by line 92. Thus, at a given scan line 93, the scanner will provide a double output of the single line in the document original. In the calibrate mode, the run length encoder 83 of FIG. 8 provides the output of run length data over line 831 to a stitch window recognizer 84. The stitch window is the region where the scan widths may potentially overlap. If there is any run length data in the stitch window, it appears as an output over line 841 from stitch window recognizer 84. The double image recognizer 85 then looks for the presence of a double image in the run length data. It measures the distance from left edge of a first line to the left edge of any subsequent line in the same scan. This distance with respect to scan line 93 of FIG. 9 is shown as W1, and the distance for scan line 94 is shown as W2. This distance is averaged over a series of consecutive scan lines, in this case 16 of them. If any distance deviates by a large number from the average, it is ignored in determining the average. In this manner the double image averager 86 operates in cooperation with the double image recognizer 85. The output from this process over line 861 produces a figure of the double image width for the two adjacent cameras and this information is stored and used for suppression of the double image suppressor 87, when the system is in the suppress double image mode. In such a mode, the run length encoder 83 will provide as an output over line 831 run length data with the double image suppressed. The double image suppressor 87 operates in novel fashion by including as a bit of data, for each pixel that is processed, whether the pixel is to be turned on or off in operation of the system. Thus pixels that are turned off are those constituting the suppressed double image. This arrangement may also satisfactorily be used to create a window around any document, where information is shown as effectively a zero output.

Figure 10:
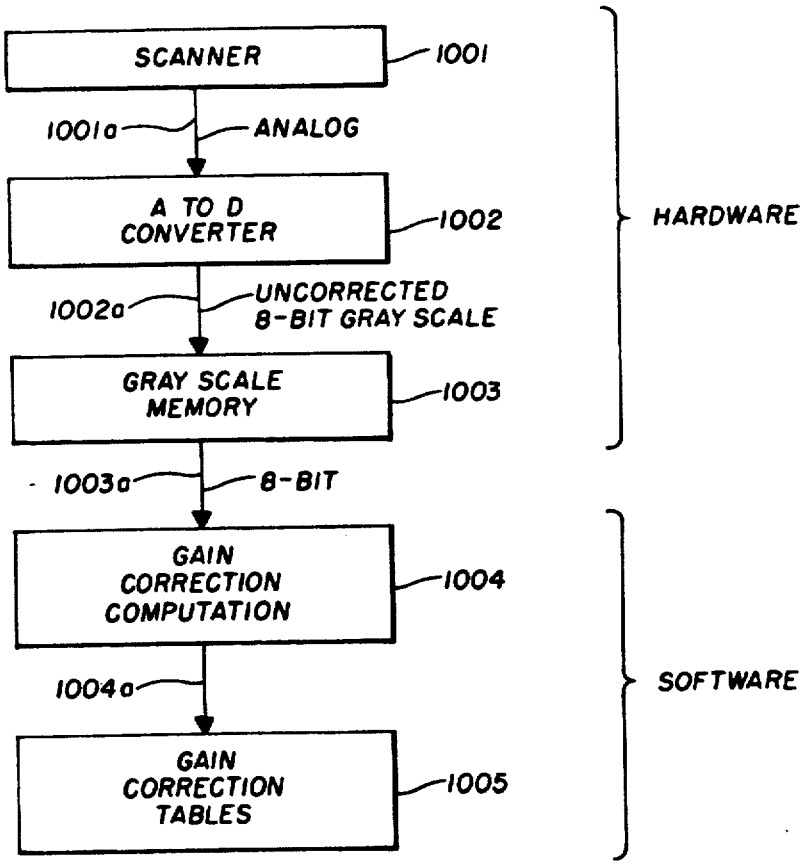
FIG. 10 shows a block diagram of a preferred embodiment of the invention according to which automatic gain correction is calibrated.
Figure 11:
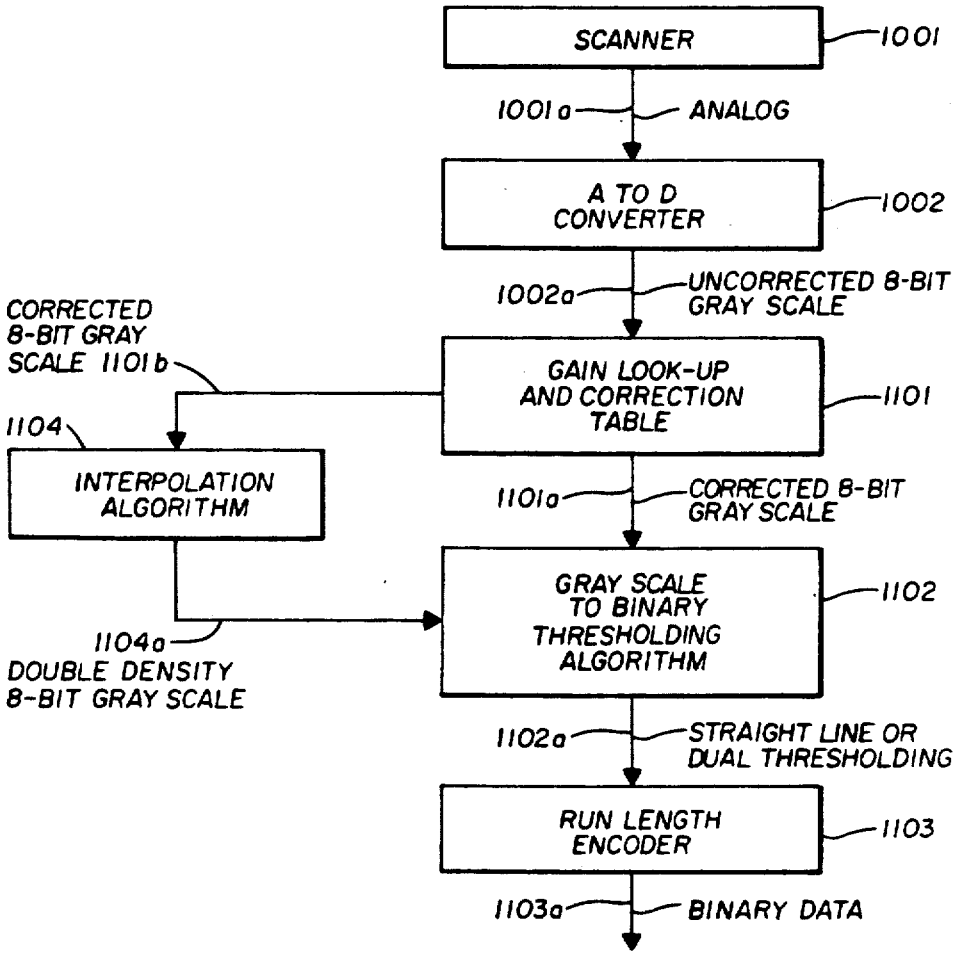
FIG. 11 shows a block diagram of a preferred embodiment of the invention according to which automatic gain correction is employed in use of an embodiment such as that of FIG. 1.

FIG. 10 shows a block diagram of a preferred embodiment of the invention according to which automatic gain correction is calibrated, so that irregularities in illumination of the document in the course of scan, variations in sensitivity of each cell in each of the CCD arrays, and similar phenomena may be compensated. From the analog output of the scanner 1001, an analog-to-digital converter 1002 is employed, so that the intensity of each pixel is given as an output over line 1002a as an uncorrected 8-bit gray scale. This is simply the output resulting when the cameras are viewing the drive roll 34 itself. (As a result the compensation will account for variations in reflectivity of the drive roll, in the event that transparencies are being scanned; alternatively it is possible to do the calibration with a blank document.) The output over line 1002a is stored in gray scale memory 1003, which is sufficient to store 8-bits for each of the 20,480 CCD cells in all ten cameras. With this data, software computes the applicable gain correction in accordance with step 1004 and gain correction tables 1005 are stored in a memory that is the same size as the gray scale memory. In operation, as shown in FIG. 11, the A to D converter output 1002 for each pixel is put through a routine where the pertinent gain correction is looked up in the table 1005 and corrected, so that the output for each pixel is a corrected 8-bit gray scale over line 1101a. In regular resolution mode, this gray scale is converted to binary using an appropriate thresholding algorithm in accordance with step 1102. The threshold may be a normal straight line threshold or hysteresis type thresholding with a dual threshold, and in any event, the output over line 1102a goes through run length encoder 1103, resulting in the output of binary data over line 1103a. In the event that double resolution is desired, the pixel data following correction pursuant to step 1101 is sent into an interpolation algorithm according to step 1104, whereby interpolated data that has corrected 8-bit gray scale information is sent into the gray scale to binary thresholding algorithm step 1102.

What is claimed is:

1. A system, operative on a substrate having (i) a rear surface and (ii) a front surface from which may be viewed graphic information recorded on the substrate, (a) for scanning the substrate and (b) for producing an electrical output related to the intensity of information at identifiable locations along each of a series of successive approximately parallel stand lines, the system comprising:

a rotattably mounted drive roll, having an outer surface and an axis of rotation about a first axis, for frictionally engaging aganist the rear surface of the substrate and, on rotation of such drive roll, moving the substrate, when so engaged, along a path;

bail means for maintaining frictional engagement of the rear surface of the substrate against the outer surface of the drive roll and for maintaining flatness of the substrate against such outer surface along a grip line that is approximately parallel to the first axis, the bail means including a bail having a straight edge loaded against the outer surface of the drive roll, such bail providing relatively less frictional force against the front surface of the substrate than is provided by the drive roll against the rear surface of the substrate, the bail further including a flat spring having a first longitudinal edge constituting the straight edge and the second longitudinal edge along which the spring is mounted so as to load the first edge aganist the outer surface of the drive roll;

drive means, for driving the drive roll, so that the substrate is moved along the path when the drive means is actuated;

camera means, for viewing the substrate form the front surface thereof along a scan line that is generally parallel to, and proximate to, the grip line and for producing an electrical output related to the intensity of the information at identifiable locations along the scan line.

2. A system, operative on a substrate having (i) a rear surface (ii) a front surface from which may be viewed graphic information recorded on the substrate, (a) for scanning the substrate and (b) for producing an electrical output relating to the intensity of information at identifiable locations along each of a series of successive approximately parallel scan line, the system comprising:

a rotatably mounted drive roll, having an outer surface and an axis of rotation about a first axis, for frictionally engaging against the rear surface of the substrate and, on rotation of such drive roll, moving the substrate, when so engaged, along a path;

bail means for maintaining a frictional engagement of the rear surface of the substrate against the outer surface of the drive roll and for maintaining flatness of the substrate against such outer surface along a grip line that is approximately parallel to the first axis;

drive means for driving the drive roll, so that the substrate is moved along the path when the drive means is actuated; and camera means, for viewing the substrate from the front surface thereof along a scan line that is generally parallel to, and proximate to, the grip line and for producing an electrical output related to the intensity of the information at identifiable locations along the scan line;

the drive roll, bail means, drive means, and camera means being included in an opto-mechanical assembly that is mounted on a substantially rigid subframe;

a frame that is subject to vibration and to distortion;

isolations means for shock-mounting theoptomechanical assembly to the frame at only first, second, and third spaced-apart locations, so that the optomechanical assembly tends to be isolated from the vibration of the frame and from torsional forces that might other wise result from distortion of the frame. fame and from torsional forces that might otherwise result from distortion of the frame.

3. A system according to claim 2, wherein the three spaced-apart locations define collectively an approximately horizontal mounting plane disposed below the first axis, and the first and second spaced-apart locations are symmetrically disposed a distance away from the projection of the first axis in the mounting plane, a line between such two spaced-apart locations being roughly coincident with the projection of one end of the drive roll in the mounting plane, and the third spaced-apart locations lies generally on the projection of the first axis in the mounting plane and is roughly coincident with the projection of the other end of the drive roll in the mounting plane.

4. A system according to claim 3, wherein the isolation means includes a shock mount at each of the first and second spaced-apart locations and a pair of shock mounts proximate to each other in the third location symmetrically disposed, in the mounting plane, about the projecting of the first axis in the mounting plane.

5. A system, operative on a substrate having (i) a rear surface and (ii) a front surface from which may be viewed graphic information recorded on the substrate, (a) for scanning the substrate and (b) for producing an electrical output related to the intensity of information at identifiable location along each of a series of successive approximatley parallel scan lines, the system comprising:

camera means, for viewing the substrate and for producing an electrical output related to the intensity of the information as identifiable locations along the scan lines, such camera means including a plurality of cameras for imaging a region of the substrate along a scan line, each camera having a common degree of image magnification, a base, and a known focus distance from the base to the scan line when its iamge is in focus;

a bed having a common plane on which each camera base is mounted and means for introducing shims between each camera and the common plane such that each camera can be adjusted to a know distance above the common plane to achieve the focus distance from its space to the scan line.

6. A mult-camera mounting and alignment system for use with a document scanner, the system comprising:

a frame;

a plurality of cameras for imaging a region of a substrate along a scan line, each camera including a linear array of light-transducing elements and two camera engagement points; and mounting means for adjustably mounting each camera onto the frame and for engaging each camera at its camera engagement points such that, when either one of such camera engagement points is fixed in relation to the frame, (i) a corresponding alignment point on the linear array is fixed at a desired orientation in relation to the scan line, and (ii) each line array is pivotally adjustable around the alignment point, along a path transverse to the scan line, to a desired final alignment that is fixed at the other camera engagement point, the mounting means including:

first and second pairs of opposing adjustment screws, in the region of each of the two engagement points, each screw having a tip and threadably movable within a first member along a path transverse to the scan line, and a deformable nib, disposed between the tips of each pair of opposing adjustment screws and affixed to a second member, wherein one of the first and second members is affixed to the frame and the other of the first and second members is affixed to the camera, so that each pair of adjustment screws may cause displacement of the camera, at one of its engagement points, relative to the frame along a path transverse to the scan line.

7. A system according to claim 6, wherein each camera has a common degree of image magnification, a base, and a known focus distance from the base to the scan line when its image is in focus;

and wherein the system further includes:

a bed having a common plane on which each camera base is mounted; and means for shimming each camera a known distance above the common plane to achieve the focus distance from its base to the scan line.

*8. A system, operative on a substrate having a rear surface and a front surface from which may be viewed graphic information recorded on the substrate, for scanning the substrate and for producing an electrical output related to the intensity of information at identifiable locations along each of a series of successive approximately parallel scan lines, the system comprising:*

*(a) a substantially rigid subframe;*

*(b) camera means, supported on the subframe, for viewing the substrate from the front surface thereof along a scan line and for producing an electrical output related to the intensity of information at identifiable locations along the scan line;*

*(c) substrate holding means, supported on the subframe, for holding the substrate;*

*(d) supporting means, mounted only to the subframe, for supporting the camera means and the substrate holding means on the subframe in a manner permitting relative motion of the camera means and the substrate in a direction transverse to the scan line;*

*(e) a frame that is subject to vibration and to distortion; and*

*(f) isolation means for shock-mounting the subframe to the frame at only three-spaced apart locations;*

*such that the subframe, the camera means and the substrate holding means tend to be isolated from the vibration of the frame and from torsional forces that might otherwise result from distortion of the frame.*

* * * * *